United States Patent

Stamer

[11] 4,033,549
[45] July 5, 1977

[54] VALVE SYSTEM FOR PROTECTION OF THE VALVE FROM ABRASION

[75] Inventor: Walter Stamer, Hamburg, Germany

[73] Assignee: Claudius Peters AG, Hamburg, Germany

[22] Filed: Dec. 27, 1974

[21] Appl. No.: 536,747

[30] Foreign Application Priority Data

Dec. 28, 1973 Germany .......................... 2364904

[52] U.S. Cl. .................. 251/86; 251/298; 403/56
[51] Int. Cl.² .......................................... F16K 25/00
[58] Field of Search .......... 137/527.4; 251/86, 298; 403/56

[56] References Cited

UNITED STATES PATENTS

| | | | |
|---|---|---|---|
| 430,301 | 6/1890 | Schenck | 251/86 |
| 1,953,448 | 4/1934 | Thaete et al. | 251/86 |
| 2,578,590 | 12/1951 | Perrault | 137/527.4 |
| 2,720,212 | 10/1955 | Kimm et al. | 251/86 |
| 2,835,269 | 5/1958 | Seymour | 251/298 |
| 2,875,975 | 3/1959 | Hajny | 251/86 |
| 2,892,608 | 6/1959 | Collins | 251/86 |
| 2,912,012 | 11/1959 | Klingler | 251/86 |
| 2,989,283 | 6/1961 | Klingler | 251/86 |
| 3,182,951 | 5/1965 | Spencer | 137/527.4 |
| 3,623,696 | 11/1971 | Baumann | 251/298 |
| 3,749,358 | 7/1973 | Bates | 251/298 |
| 3,828,808 | 8/1974 | Ortelli | 251/228 |
| 3,831,622 | 8/1974 | Grewer et al. | 251/86 |
| 3,842,187 | 10/1974 | Barkan | 403/56 |

FOREIGN PATENTS OR APPLICATIONS

| | | | |
|---|---|---|---|
| 805,935 | 5/1936 | France | 251/86 |
| 1,131,476 | 7/1959 | Germany | 251/86 |
| 352,760 | 9/1937 | Italy | 251/86 |
| 848,682 | 1/1957 | United Kingdom | 251/86 |
| 707,558 | 4/1952 | United Kingdom | 251/86 |

Primary Examiner—William R. Cline
Assistant Examiner—H. Jay Spiegel
Attorney, Agent, or Firm—Otto John Munz

[57] ABSTRACT

A valve system for protection of the valve surface from abrasion and wear normally caused by the flow vertically therethrough of wear-causing materials, such as pulverized cement, sand, ashes, ground and stone dust, hydrated lime, zincoxide, zinc mixtures, aluminum oxide, perlite, sewage and other granulated or comminuted fluid materials in a dry or liquid state, often piped under considerable pressure differences, has an elongated vertical housing with a funnel on top, an annular seat with an orifice wider than that of the funnel beneath it, a bulbous valve for closing the seal from the side opposite of the funnel and protruding into the seat when closed, means of support of the valve pivotally attached to the valve and control means of the means of support, to swing the valve laterally in and out of sealing position with the seat.

The valve, the means of support of the valve and the means to control the means of support are mounted within the housing so that in the valve-open position they are away from the flow path of the material and thus protected from the abrasive effects thereof.

Means are provided to safeguard an airtight seal, even when coarse particles remain attached to the seal or other operating parts of the system and to increase the pressure of the valve against the seat.

6 Claims, 7 Drawing Figures

VALVE SYSTEM FOR PROTECTION OF THE VALVE FROM ABRASION

CROSSREFERENCE TO A RELATED APPLICATION

Priority of corresponding German Pat. application No. P 23 64 904.9 filed on Dec. 28, 1973 is claimed under the Convention.

FIELD OF THE INVENTION

A valve actuated mechanically comprising several fixed and movable parts acting in unison to swing the valve into the valve closing position laterally by an arm, to the end of which the valve is pivotally mounted, with means to produce an airtight valve and seat contact with an increased pressure by the valve against the seal or seat and means to swing the valve and its support means out of the flow-path of the material. (Class 251-298).

THE PRIOR ART

The prior art is represented by U.S. Pat. No. 3,496,958, issued Feb. 24, 1970 to Magnusson et al., for a Sand Valve for sand-blast apparatus.

In order to protect the valve from the eroding and abrasive effects of the flow-path of wear-causing materials, the prior art distances the valve from the seat in the valve-open position as much as the valve box permits. This great distancing, however, interferes with the tightness and safety of the seal in the valve-closed position. Even minor leaks of such materials cause considerable erosion and the prior art did not solve satisfactorily the tasks of creating an airtight seal in a valve system for coarse materials when there is a great unusual friction between seat and valve and particularly when wide manufacturing tolerances are involved, or when particles remain stuck to the seat and/or other operative parts and of simultaneous protection of the valve and its operating mechanism from the flow of the piped material.

An accurate guidance of the valve is necessary for this purpose and requires close tolerances. These are very difficult to observe, considering the long moving distance required by the prior art devices and the substantial dimensions of the conduits involved, such as cement pipe lines. A spherical shape of the sealing surfaces at the valve has been proposed, which shape, when the valve is non-centrically pivotally fixed to the support does make it possible to adjust the valve with respect to the seat. Such an adjusting movement, however, is conceivable only when the friction between the valve and the seat is very small. This requirement normally is not satisfied, even when fine dry materials are conveyed, let alone when coarse wear-producing material is conveyed.

SUMMARY OF THE INVENTION

The objects of the invention are:

to improve on the prior art and to provide within a housing a valve system, which in the valve-closed position effectively creates an airtight safe pressurized seal between the valve and seat, notwithstanding any particles remaining stuck to the seat, the valve or other operating parts and notwithstanding wide manufacturing tolerances;

to provide such a system which causes the valve and its operating parts to be swung laterally out of the flow path of the material in the valve-open position to provide a valve system of the kind described, which has the material inlet centrally superimposed over a seat, which has a smaller area than that of the inlet, thereby limiting and guiding the flow path of the material away from the surface of the seat;

to provide the valve system mentioned in which the valve support means are actuated by a valve support control means, permanently positioned away from the flow path of the material and the valve with its support means positioned away from the flow-path during the valve-open position;

to provide the means of swinging the valve with its support to and from the seat and out of the way of the flow path of the material without frictional engagement of the seat and valve surfaces, laterally in a plane of the longitudinal axis of the housing;

to provide means to pivot the valve into the optimum seat position, notwithstanding any particles which may adhere to the seat or valve; and to provide a spring force to push the valve into an airtight engagement with the seat.

Other objects of the invention will become apparent from the following drawings considered in connection with the specification and claims.

BRIEF DESCRIPTION OF THE DRAWINGS

In the drawing the same reference numerals denote the same or equivalent parts and repetitions of depictions of parts common to the various figures are avoided for purposes of brevity.

DESCRIPTION OF THE PREFERRED EMBODIMENTS

Figure 1:
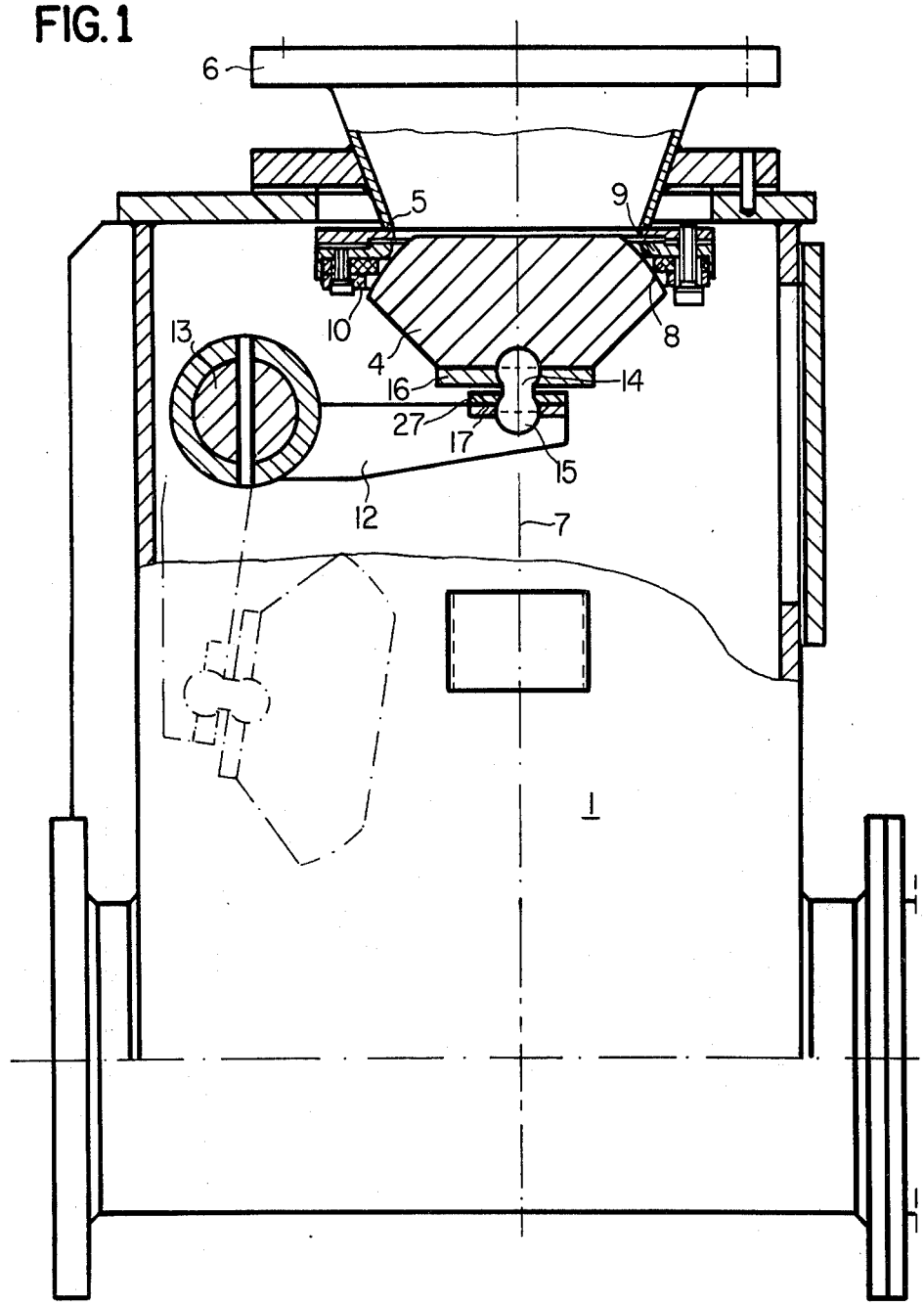
FIG. 1 is a view partly in vertical cross section of the device of the invention with the valve and its support shown in the valve-open position in dotted lines and by way of example the shape of the valve surface as bulbous.

There are depicted on the several figures a valve housing 1, having a vertically elongated cross section. The housing has in the top 2 a valve seat 3 with an associated valve 4, seated in it from beneath. The seat is mounted in the turbulent region of a vertical flow path shown on FIG. 5, beneath a funnel 5. The upper flange 6 of the funnel is connected with a feed line and the material may be fed by pressure or gravity with the housing arranged vertically along axis 7.

Figure 5:
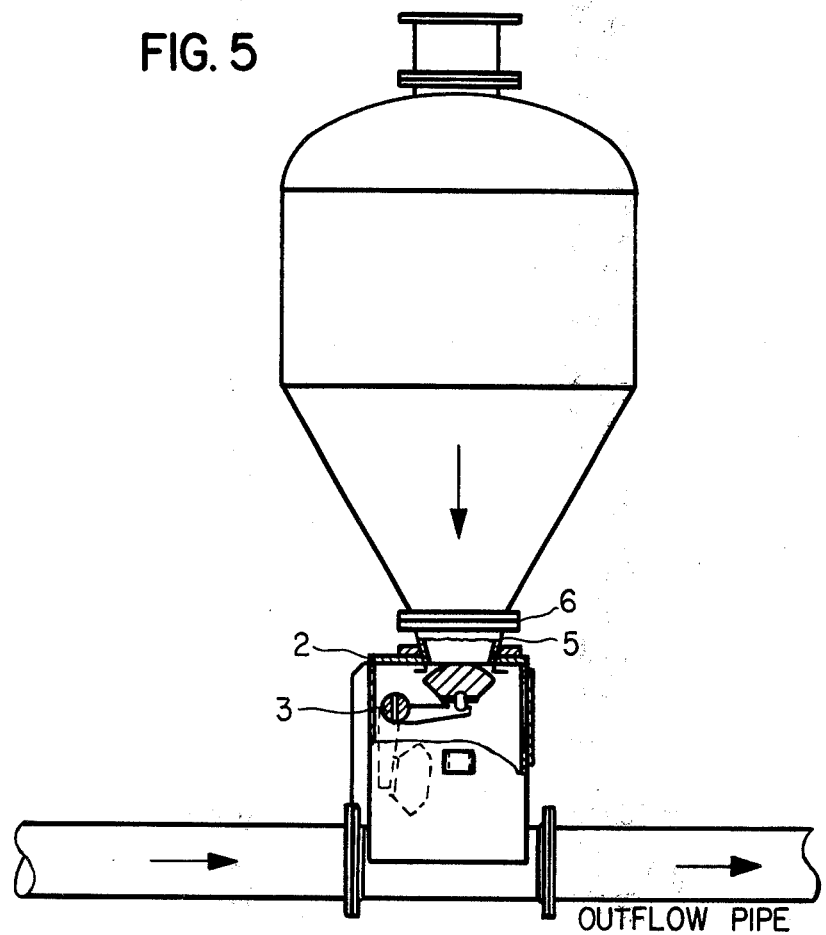
FIG. 5 is a front view, partly in cross section, showing the valve housing of the invention connected between its inlet- and outlet-ports.

The valve shown on FIG. 1 has a bulbous surface of a truncated cone segment with the bottom rim thereof extending beyond the perimeter of the valve seat 3. (FIG. 5).

The valve seat is constructed with an elastic ring 8, clamped in between two casing rings 9 and 10 which are connected with a flange 11, fastened to the bottom edge of the funnel. The seat is mounted concentrically to axis 7.

THE VALVE SUPPORT

The valve is mounted with its bottom attached to a support arm 12.

The support arm is shown in a horizontal position in the valve-closed position. The valve-end of arm 12 has attached perpendicularly thereto the lower end of a pressure rod 14, the upper end of which in turn is connected with the bottom of the valve. Both ends of the rod are seated in and pivotally movable relative to the valve and rod, respectively, to which they are attached.

The ends of the rod are enlarged into ball-bearing hemispheres 15 and mate with corresponding hollow hemispheres of bearing boxes in the bottom of the valve and the top of the valve-end of the support arm, respectively.

The ball bearings are held by the hemispheres and in the bearing box of the support arm by plates 16 and 17 and in the bearing box of the valve also by a resilient sleeve 27. Thus the rod is connected pivotally movable relative to the valve and the support arm and the valve is movable relative to the support arm transversely to the longitudinal axis when it enters the valve-closed position and it adapts itself readily and exactly to the shape of the seat. The sleeve urges the flap valve into the normal position.

The angularly movable rod makes the system largely insensitive to the presence of the wear-producing material and allows a sufficient adjusting movement even when dust or fine particles have penetrated the connecting area between the rod and the valve.

Because of this connection the valve itself also carries out an angular movement and because of the bulbous shape of its abutting surface the sealing conditions remain the same at any angle of adjustment of the position of the valve.

If a pivoting movement of the valve is to be admitted without accepting a simultaneous pivoting of the pressing rod, it is advisable to arrange the fulcrum, at which the rod cooperates with the valve, in the center of curvature of the sealing surface of the valve. This is especially advantageous when, due to the presence of the material which is being conveyed, it must be expected that the mobility of the rod might be gradually impaired. An accurate ball shape of the sealing surface of the valve is necessary only when the deviation of the sealing line from the circular shape, caused by the conical approximation to the ball shape is greater than is tolerable. When the seat is provided with an elastic packing, it will be possible very frequently to be satisfied with a conical approximation of the sealing surface of the valve to the ball shape. This does not apply of course only to the construction of the laterally movable member as the rod.

THE SUPPORT CONTROL MEANS

The arm supporting the valve is mounted at its end opposite from the valve end with a collar 13a connected to a shaft 13 by a diametral pin 13b. The shaft extends through the housing for a possible connection with an operator, such as a power drive positioned outside the housing 1. See FIG. 7.

The distance between the shaft and the central axis 7 of the valve may vary within manufacturing tolerances, which are greater than the tolerance normally occurring between the seat and the valve.

By turning the support arm counterclockwise the valve closes and forms with the seat an airtight seal, any impediments in the contact between them caused by dust and material particles adhering to the seat or valve, notwithstanding.

By turning the support arm clockwise into the valve-open position the valve together with the support arm are swung laterally out of the flow-path of the material and thus are protected from abrasion therefrom. In both instances friction between valve and seat is eliminated because the pivoting valve yields to the deformations and the sealing surface of the valve abuts to the seat uniformly over the entire periphery.

Figure 3:
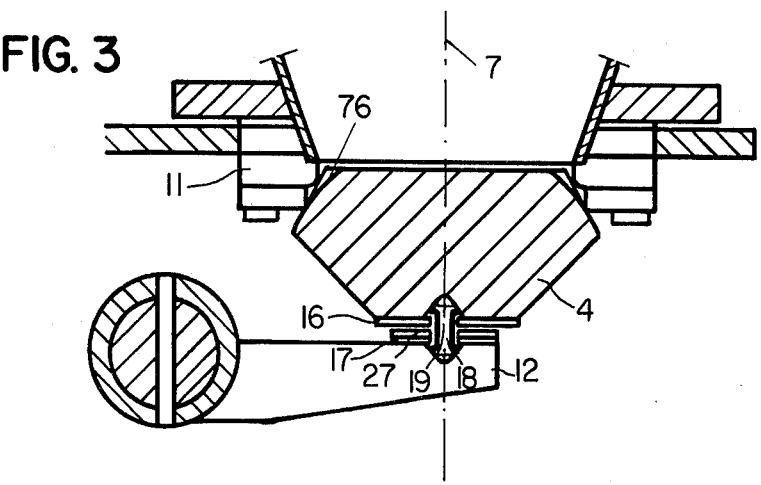
FIG. 3 is a cross sectional view of a section of the device of FIG. 1, showing by way of example a modification of the shape of the valve as a truncated cone.

The device shown on FIG. 3 differs from that according to FIG. 1 in that the rod bears at both ends rounded surfaces 18, having the cross section of a cone.

In this structure the support proper takes place by means of the shoulders at the apex of the cone or, respectively, at the corresponding portion of the recess which cooperates with the cone. The recess is wider than the cone. When shaped as a hollow cone the support presents therefore, a larger angle of cone. In the middle, the rod is narrowed at 19, so that the cones in the transition to the narrower portion 19 from a collar behind which plates 16, 17 engage, which are rigidly connected, on the one hand, with valve and, on the other hand, with the arm 12. By the relatively small distance from each other of the plates 16 and 17 and the intermediate layer or sleeve 27, the pivoting play of the valve is relatively closely limited since the plates act as stops. Furthermore, by suitable dimensioning of cones 18 and the recesses cooperating therewith, the pivoting motion of the rod 14 is limited. As a whole, the play of motion is of such dimension that at each practically occuring deviation of the place of support in arm 12 from the axis of symmetry 7 of the closure element, the sealing surface 20 of the valve still enters the seat in an orderly contact therewith.

The valve is in the embodiment of FIG. 3 dimensioned in such a way that the point of support formed between it and the cone 18, assigned thereto, is positioned in the center of the curvature of the ball-shaped sealing surface 20. In the adjustment of the valve of the seat, a sliding motion between valve and seat is therefore not required. When, for instance, during the movement of closure, the valve comes first in contact with the edge of the seat shown in the drawing at the left, because, for instance, the arm 12, due to inaccuracies in the assembling or processing is positioned too far left, or because the valve happens to be pivoted toward the left on arm 12, the valve carries out subsequently a pivoting motion about the said point of the first contact with the seat until it abuts completely thereto, in which process the rod 14 follows this pivoting motion correspondingly.

In the embodiment according to FIG. 4, the shape of the rod and the support arm resemble those described with reference to FIG. 3.

It is suitable that the lateral movement of the arm be limited, so that the rod assumes to the largest possible extent the normal position provided for. As shown on FIG. 4 the said limitation is particularly advantageous when the rod is forced into the normal position by spring tension. This applies especially in the opening movement when the closure rod is pivoted from its vertical position and is urged, by gravity, to assume a position of lateral displacement with relation to the arm. In many cases, however, it is sufficient to provide mechanical stops which limit the lateral movement of the rod with respect to the arm. Such stops are suitably made of flexible material so as to counteract gravity and centrifugal force.

Figure 4:
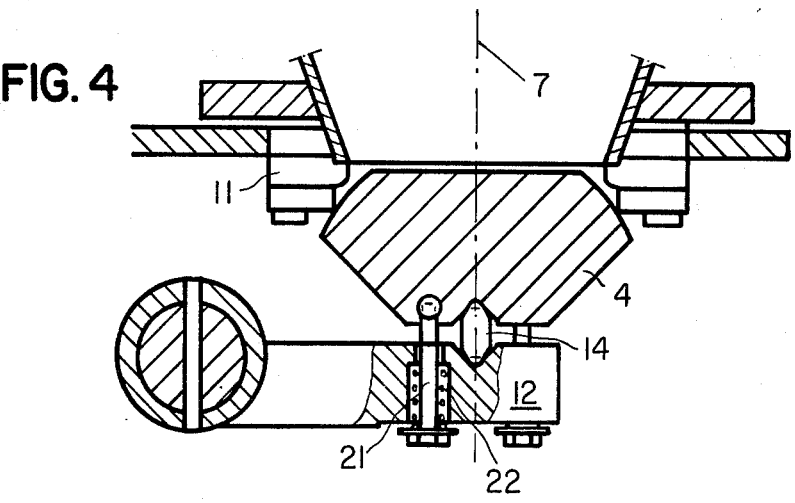
FIG. 4 is a cross sectional view of a section of FIG. 1, showing the modification depicted on FIG. 3 together with means to maintain a spring compression between seat and valve.

The middle, thinner portion of the rod 14, depicted upon FIG. 3 is dispensable since the valve may be held to the arm 12 by pins 21, FIG. 4 evenly distributed about the support area. The pins are firmly screwed in the valve and present a play, in longitudinal and transverse directions with respect to the arm 12 to which they transmit the holding force via a pressure spring 22 in each case. The pins and springs are adjusted in such a way that the spring tension urges the valve into normal position in which the axis of the valve and the axis of the rod coincide.

Figure 2:
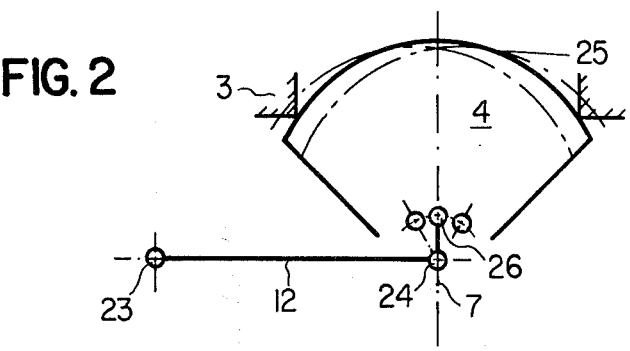
FIG. 2 is a diagrammatic view of a section of FIG. 1 on an enlarged scale in geometrical proportions.

FIG. 2 illustrates the geometrical proportions in the arrangement of the invention when the place of support provided at the valve coincides with the center of the bulbous sealing surface (FIGS. 3 and 4). If the length of the arm 12 between its pivoting axis 23 and the lower point of support 24 of the rod is dimensioned correctly in such a way that the point of support 24 is positioned on the longitudinal axis 7 of the seat, the surface 25 of the valve assumes its normal position as drawn in full lines on FIG. 2. The point of support 26 of the rod in the vlave is at any rate positioned on axis 7. This applies even when, due to an accidental pivoting motion, the valve in its entirety may not be completely coaxial with the axis 7.

In practice, however, due to manufacturing and assembling tolerances, the point of support 24 will normally not be positioned on the center axis 7 of the seat. The valve and rod then adapt themselves correspondingly, as it is shown in dot-dash lines on FIG. 2.

In many cases it is not necessary to keep the mutually adjustable parts continuously movable since a possible jamming of the movable parts by the conveying material will fix those parts in the position which actually is the optimum position of closure.

FIG. 5 depicts in greater detail the difference between the larger diameter of the seat 3 and the smaller diameter of funnel outlet orifice 5 located above it. In a free vertical fall the smaller diameter of the funnel outlet prevents contact between the material and larger sized seat, so that the sealing surface is removed from the flow path of the material.

The diameter of the seat depends upon the maximum quantity of the material preset to be delivered. For this reason a control of the funnel outlet orifice is advantageous.

The diameter of the lower outlet from the housing into the outflow pipe is at least equal to the maximum possible flow output of the material in view of the presence of the expected amount and pressure of gas in the outflow pipe.

Experiments established that the materials behaved in the flow path from the funnel through the seat and the open valve and through the outflow pipe as calculated, without leaving any particles sticking to the seat or the open valve and its operative parts and without affecting disadvantageously their outflow through the outflow pipe.

Figure 6:
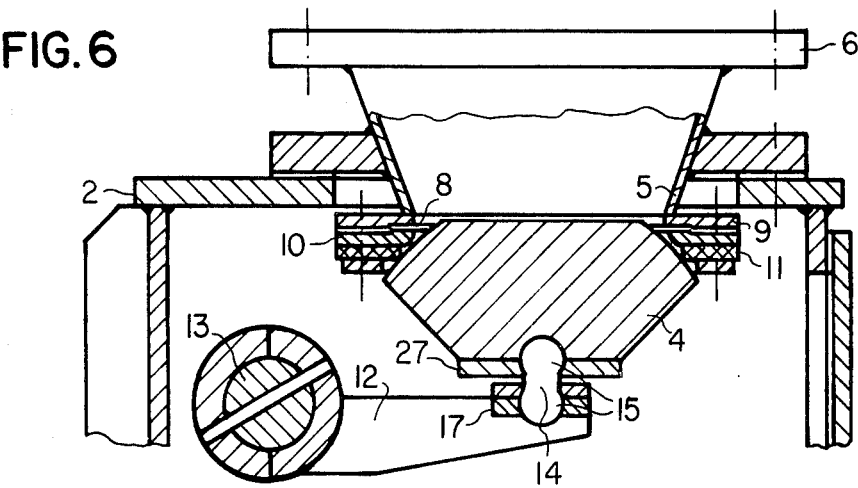
FIG. 6 is a vertical cross sectional view illustrating an inventive detail of FIGS. 2 and 3.
Figure 7:
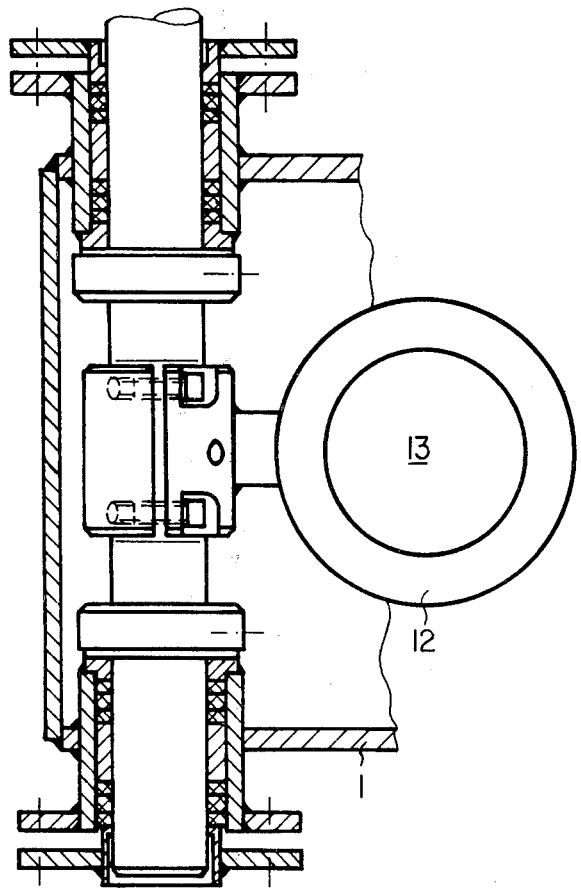
FIG. 7 is a cross sectional view of a construction detail of FIGS. 1, 3 amnd 4.

FIGS. 6 and 7 depict the means to mount the valve support control means 13 and a portion of the valve support means 12 within the housing away from the vertical flowpath of the material for a possible connection with a power drive.

What is claimed is:

1. A flap valve type closure comprising, a housing having a vertical first axis and a top wall defining a circular material-inlet orifice symmetrical about said first axis, an annular valve seat in said housing contiguous to, below and coaxial with said orifice, said orifice having a radius less than that of said seat, a control shaft journaled in said housing for pivoting about a second axis normal to and offset from said first axis, an arm fixed at one end to said shaft and pivotable therewith from a first position wherein its distal end lies on said first axis, to a second position wherein said distal end is offset from said first axis, a flap valve carried by the distal end of said arm and having a surface formed as a portion of the surface of a sphere engageable with said seat in sealing relation therewith, said surface having a geometrical center essentially on said first axis when said arm is in its said first position, and a rod connected at its upper and lower ends to said flap valve and arm, respectively, and mounting said valve for limited universal pivoting about said geometrical center, said arm in its said second position moving said valve to position laterally offset from said first axis.

2. The closure of claim 1, the lower end of said rod being connected to the distal end of said arm, for limited universal pivoting about a point spaced a fixed distance from and below said geometrical center.

3. The closure of claim 2, the ends of said rod being generally spherical, with centers spaced by said fixed distance, each engaging and fitting respective cavities in said valve and arm.

4. The closure of claim 3, the cavity in said valve being hemispherical, and a plate secured to the lower surface of said valve and having a central aperture forming a smooth continuation of the surface of said hemispherical cavity, to thus retain said valve to said rod.

5. The closure of claim 2, the ends of said rod being conical with equal first apex angles, and engageable in respective first and second conical cavities in said valve and arm, each of said first and second cavities having an apex angle greater than said first apex angle.

6. The closure of claim 5, there being a plurality of holes in said arm and equiangularly spaced about and parallel with said first axis when said arm is in its said first position, a plurality of pins each slidably fitting a respective one of said holes, each of said pins being connected at its upper end to said valve for universal limited pivoting, and spring means carried by said rod and yieldingly urging each said pin in parallel with said first axis to thereby urge said valve to position seated on the upper end of said rod.

* * * * *